(12) United States Patent
Hattori et al.

(10) Patent No.: US 12,126,291 B2
(45) Date of Patent: Oct. 22, 2024

(54) CONTROL DEVICE, ELECTRIC COMPRESSOR, RIPPLE VOLTAGE ABNORMALITY CAUSE DETERMINATION METHOD AND PROGRAM

(71) Applicant: MITSUBISHI HEAVY INDUSTRIES THERMAL SYSTEMS, LTD., Tokyo (JP)

(72) Inventors: Makoto Hattori, Tokyo (JP); Toyohisa Kawashima, Tokyo (JP); Kyohei Watanabe, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 0 days.

(21) Appl. No.: 17/767,826

(22) PCT Filed: Oct. 20, 2020

(86) PCT No.: PCT/JP2020/039451
§ 371 (c)(1),
(2) Date: Apr. 8, 2022

(87) PCT Pub. No.: WO2021/079888
PCT Pub. Date: Apr. 29, 2021

(65) Prior Publication Data
US 2024/0088818 A1  Mar. 14, 2024

(30) Foreign Application Priority Data
Oct. 24, 2019 (JP) .................. 2019-193695

(51) Int. Cl.
*H02P 1/02* (2006.01)
*B60H 1/32* (2006.01)
*H02P 29/024* (2016.01)

(52) U.S. Cl.
CPC ......... *H02P 29/024* (2013.01); *B60H 1/3205* (2013.01)

(58) Field of Classification Search
CPC .................... H02P 29/024; B60H 1/3205
See application file for complete search history.

(56) References Cited

U.S. PATENT DOCUMENTS

| 5,712,551 A * | 1/1998 | Lee .......................... H02P 6/22 |
| | | 318/458 |
| 2004/0066200 A1 | 4/2004 | Fujioka et al. |

(Continued)

FOREIGN PATENT DOCUMENTS

| JP | 2004-135393 A | 4/2004 |
| JP | 2007-240450 A | 9/2007 |

(Continued)

OTHER PUBLICATIONS

International Search Report for International Application No. PCT/JP2020/039451, dated Dec. 22, 2020, with an English translation.

(Continued)

*Primary Examiner* — Muhammad S Islam
(74) *Attorney, Agent, or Firm* — Birch, Stewart, Kolasch & Birch, LLP

(57) ABSTRACT

Provided is a method for determining the generation source of ripple voltage when abnormal ripple voltage is detected. The control device is for an electric compressor, the control device comprising: a detection unit that detects ripple voltage; a judgment unit that judges whether the ripple voltage is abnormal based on the value of the ripple voltage; and a cause determination unit that determines whether the cause of the abnormality is the electric compressor or some other external device, based on the control result of the electric compressor.

17 Claims, 6 Drawing Sheets

(56) References Cited

U.S. PATENT DOCUMENTS

2019/0002013 A1 1/2019 Terdy et al.
2020/0224948 A1* 7/2020 Kim ..................... F25B 49/022

FOREIGN PATENT DOCUMENTS

| JP | 2011-94920 A | 5/2011 |
| JP | 2017-212846 A | 11/2017 |

OTHER PUBLICATIONS

Written Opinion of the International Searching Authority for International Application No. PCT/JP2020/039451, dated Dec. 22, 2020, with an English translation.

* cited by examiner

CONTROL DEVICE, ELECTRIC COMPRESSOR, RIPPLE VOLTAGE ABNORMALITY CAUSE DETERMINATION METHOD AND PROGRAM

TECHNICAL FIELD

The present disclosure relates to a control device, an electric compressor, a ripple voltage abnormality cause determination method, and a program. The present application claims priority based on Japanese Patent Application No. 2019-193695 filed in Japan on Oct. 24, 2019, the contents of which are incorporated herein by reference.

BACKGROUND ART

An electric compressor is one of the components of a car air conditioner mounted on a vehicle. In a drive circuit that drives the electric compressor, a ripple voltage that vibrates at a predetermined cycle is generated. When the ripple voltage becomes large, resonance occurs and an excessive current flows. The electric compressor is driven by a high-voltage battery as a power source. In addition to the car air conditioner, a vehicle-side load may be connected to the battery.

PTL 1 discloses a technique for detecting a ripple voltage of an alternator for a vehicle and determining that the alternator is out of order when a difference between the maximum value and the minimum value of the ripple voltage exceeds a predetermined value.

CITATION LIST

Patent Literature

[PTL 1] Japanese Unexamined Patent Application Publication No. 2004-135393.

SUMMARY OF INVENTION

Technical Problem

In order to protect the equipment from the excessive current due to the resonance caused by the ripple voltage, it is conceivable to control the motor of the electric compressor to be stopped. However, when a vehicle-side load is connected to the battery, the vehicle-side load may generate a ripple voltage. In order to cope with the resonance caused by the ripple voltage, it is necessary to isolate the source of the problematic ripple voltage.

The present disclosure provides a control device, an electric compressor, a ripple voltage abnormality cause determination method, and a program which are capable of solving the above problems.

Solution to Problem

A control device of an electric compressor according to the present disclosure includes a detection unit that detects a ripple voltage; a determination unit that determines whether the ripple voltage is abnormal based on a value of the ripple voltage; and a cause determination unit that determines whether the cause of the abnormality is the electric compressor or some other external equipment, based on the control result of the electric compressor.

The electric compressor of the present disclosure includes the above-described control device.

In a ripple voltage abnormality cause determination method according to the present disclosure, a control device detects a ripple voltage, determines whether or not the ripple voltage is abnormal, based on a value of the ripple voltage, and determines whether a cause of the abnormality is equipment to be controlled or another equipment, based on a control result of the equipment to be controlled.

A program according to the present disclosure causes a computer to function as means for detecting a ripple voltage, means for determining whether or not the ripple voltage is abnormal, based on a value of the ripple voltage, and means for determining, based on a control result of predetermined equipment, whether a cause of the abnormality is the equipment or another equipment.

Advantageous Effects of Invention

According to the control device, the electric compressor, and the ripple voltage abnormality cause determination method, and the program described above, when the ripple voltage is abnormal, a source of a ripple voltage that causes abnormality can be determined.

DESCRIPTION OF EMBODIMENTS

Embodiment

Hereinafter, an electric compressor according to an embodiment will be described with reference to FIGS. 1 to 6.

(Configuration)

Figure 1:
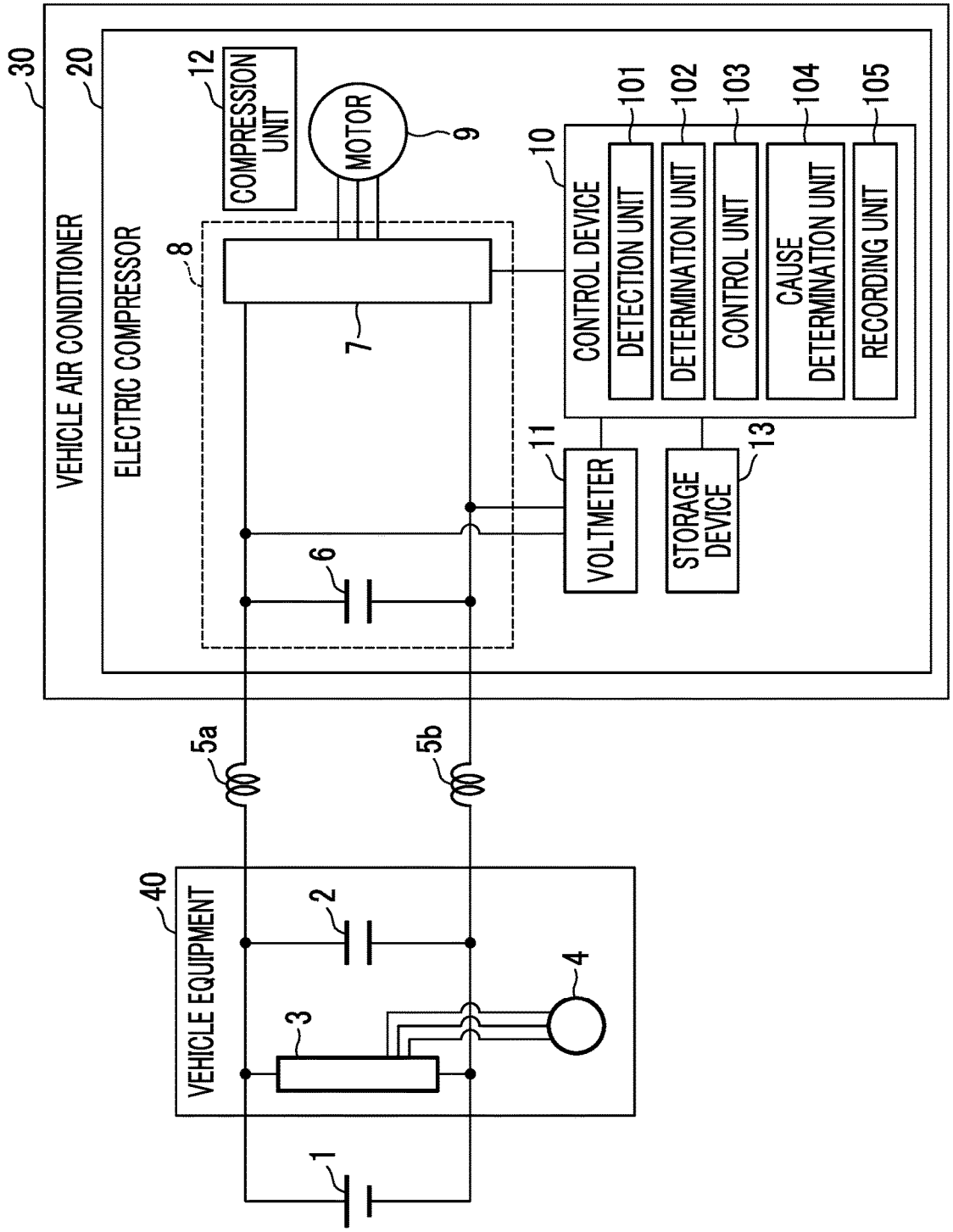
FIG. 1 is a diagram showing an example of an electric compressor in an embodiment.

FIG. 1 shows an example of a schematic configuration of an electric compressor 20 included in a vehicle air conditioner 30. A battery 1, the vehicle air conditioner 30, vehicle equipment 40, and an electric circuit for driving the battery 1, the vehicle air conditioner 30, and the vehicle equipment 40, illustrated, are mounted on the vehicle. Inductors 5a and 5b indicate the inductor components of the electric circuit including the battery 1, the vehicle air conditioner 30, and the vehicle equipment 40.

The battery 1 is a power supply unit mounted on a vehicle (outside the vehicle air conditioner 30). The battery 1 supplies high-voltage DC power to the vehicle air conditioner 30 and the vehicle equipment 40. The vehicle equipment 40 includes a capacitor 2, an inverter 3, and a load 4 connected to the inverter 3. In the vehicle equipment 40, the inverter 3 converts the high-voltage DC power supplied from the battery 1 into three-phase AC power, and supplies the three-phase AC power to the load 4. Assuming that the carrier frequency of the inverter 3 is f1, a ripple voltage (described later) having a frequency f1 originating from the vehicle equipment 40 may be generated in the electric circuit.

The vehicle air conditioner 30 includes the electric compressor 20. The electric compressor 20 is an inverter-integrated electric compressor in which the inverter 7 is integrally incorporated. The electric compressor 20 includes a power supply circuit 8 including a capacitor 6 and an inverter 7, a motor 9, a control device 10, a voltmeter 11, a compression unit 12, and a storage device 13. The electric compressor 20 is driven by the inverter 7 converting the high-voltage DC power supplied from the battery 1 into three-phase AC power and applying the three-phase AC power to the motor 9. The inverter 7 and the motor 9 are connected by a power line. The inverter 7 converts the DC power supplied from the battery 1 into three-phase AC power and supplies the three-phase AC to the motor 9. The inverter 7 is controlled by the control device 10. The control device 10 includes a microcomputer, and controls the motor 9 to execute a desired operation via the inverter 7, based on a control signal acquired from an Electric Control Unit (ECU) or the like (not shown). For example, the control device 10 controls the rotation speed of the motor 9. When the motor 9 is rotationally driven according to the instruction from the inverter 7, the compression unit 12 compresses the refrigerant and supplies the refrigerant to the refrigerant circuit (not shown) included in the vehicle air conditioner 30. The inverter 7, the voltmeter 11, and the control device 10 are connected by a signal line. The voltmeter 11 detects the DC voltage input to the inverter 7 and outputs the detected voltage value to the control device 10. The voltage value measured by the voltmeter 11 includes a ripple component. The value obtained by subtracting the DC voltage value derived from the battery 1 from the voltage value measured by the voltmeter 11 is called a ripple voltage. Assuming that the carrier frequency of the inverter 7 is f0, a ripple voltage having a frequency f0 originating from the electric compressor 20 may be generated in the electric circuit. When the ripple voltage of the frequency f0 or f1 becomes large, resonance occurs in the resonance circuit formed by the capacitors 2 and 6 and the inductors 5a and 5b, and an excessive current flows in the electric circuit of FIG. 1. Therefore, the control device 10 monitors the fluctuation of the voltage value measured by the voltmeter 11, determines that the ripple voltage is abnormal when the value W of the ripple voltage becomes equal to or higher than a predetermined threshold value α, stops or decelerates the motor 9, and performs control to reduce the ripple voltage. Thus, the ripple voltage originating from the electric compressor 20 is reduced. However, the ripple voltage originating from the vehicle equipment 40 cannot be reduced even if the motor 9 is decelerated.

The control device 10 can control the electric compressor 20, but cannot control the vehicle equipment 40. That is, the control device 10 can reduce the ripple voltage originating from the electric compressor 20, but cannot reduce the ripple voltage originating from the vehicle equipment 40. In the control device 10, the value of the frequency f1 may also be unknown.

When an abnormality in the ripple voltage is detected, the control device 10, by utilizing this property, performs a cause determination process for separating whether the source of the ripple voltage is the electric compressor 20 or the vehicle equipment 40. The control device 10 is connected to the storage device 13. When an abnormality in the ripple voltage is detected, the control device 10 determines the source thereof, and when the source is the vehicle equipment 40, records the occurrence of the abnormality in the ripple voltage in the storage device 13.

The control device 10 includes a detection unit 101, a determination unit 102, a control unit 103, a cause determination unit 104, and a recording unit 105.

The detection unit 101 acquires the voltage value measured by the voltmeter 11. The detection unit 101 calculates the ripple voltage by subtracting a predetermined DC voltage value based on the battery 1 from the acquired voltage value, and analyzes the fluctuation of the ripple voltage in a predetermined time. For example, the detection unit 101 detects the difference between the maximum value and the minimum value of the acquired voltage value in a predetermined minute time. This value is called the value W of the ripple voltage. The detection unit 101 detects the value W of the ripple voltage every minute time. The ripple voltage to be detected by the detection unit 101 may include a voltage originating from the electric compressor 20 (inverter 7) and a voltage originating from the vehicle equipment 40 (inverter 3).

The determination unit 102 compares the value W of the ripple voltage calculated by the detection unit 101 with a predetermined threshold value α. When the value W of the ripple voltage is equal to or higher than the threshold value α, the determination unit 102 determines to perform the cause determination process of the abnormal ripple voltage.

The control unit 103 indicates the rotation speed of the motor 9 to the inverter 7. When the determination unit 102 determines to perform the cause determination process, the control unit 103 stops the motor 9. Alternatively, the control unit 103 reduces the rotation speed of the motor 9 to a predetermined target rotation speed X (rpm). When the motor 9 is stopped or the rotation speed is reduced, the value W of the ripple voltage originating from the electric compressor 20 can be reduced.

The cause determination unit 104 determines whether the source of the abnormal ripple voltage is the electric compressor 20 or some other external equipment (vehicle equipment 40), based on the control result of the electric compressor 20 (motor 9) by the control unit 103.

When the cause determination unit 104 determines that the source of the abnormal ripple voltage is the vehicle equipment 40, the recording unit 105 records in the storage device 13 that the abnormality in the ripple voltage caused by the vehicle equipment 40 is detected. The storage device 13 is, for example, a microcomputer including a non-volatile storage medium.

(Cause Determination Process)

Next, the cause determination process will be described with reference to FIGS. 2 and 3.

Figure 2:
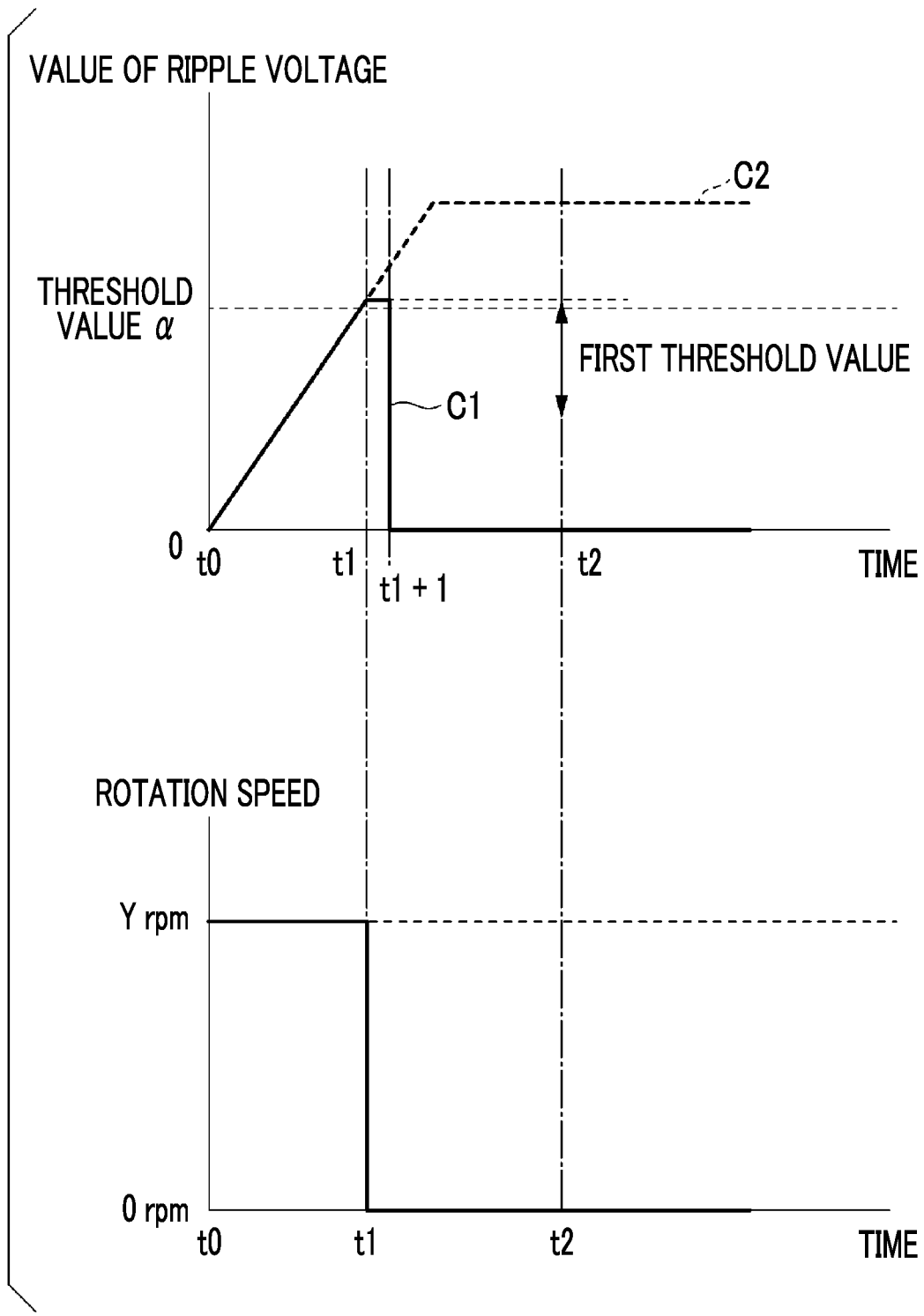
FIG. 2 is a first diagram illustrating a cause determination process in the embodiment.
Figure 3:
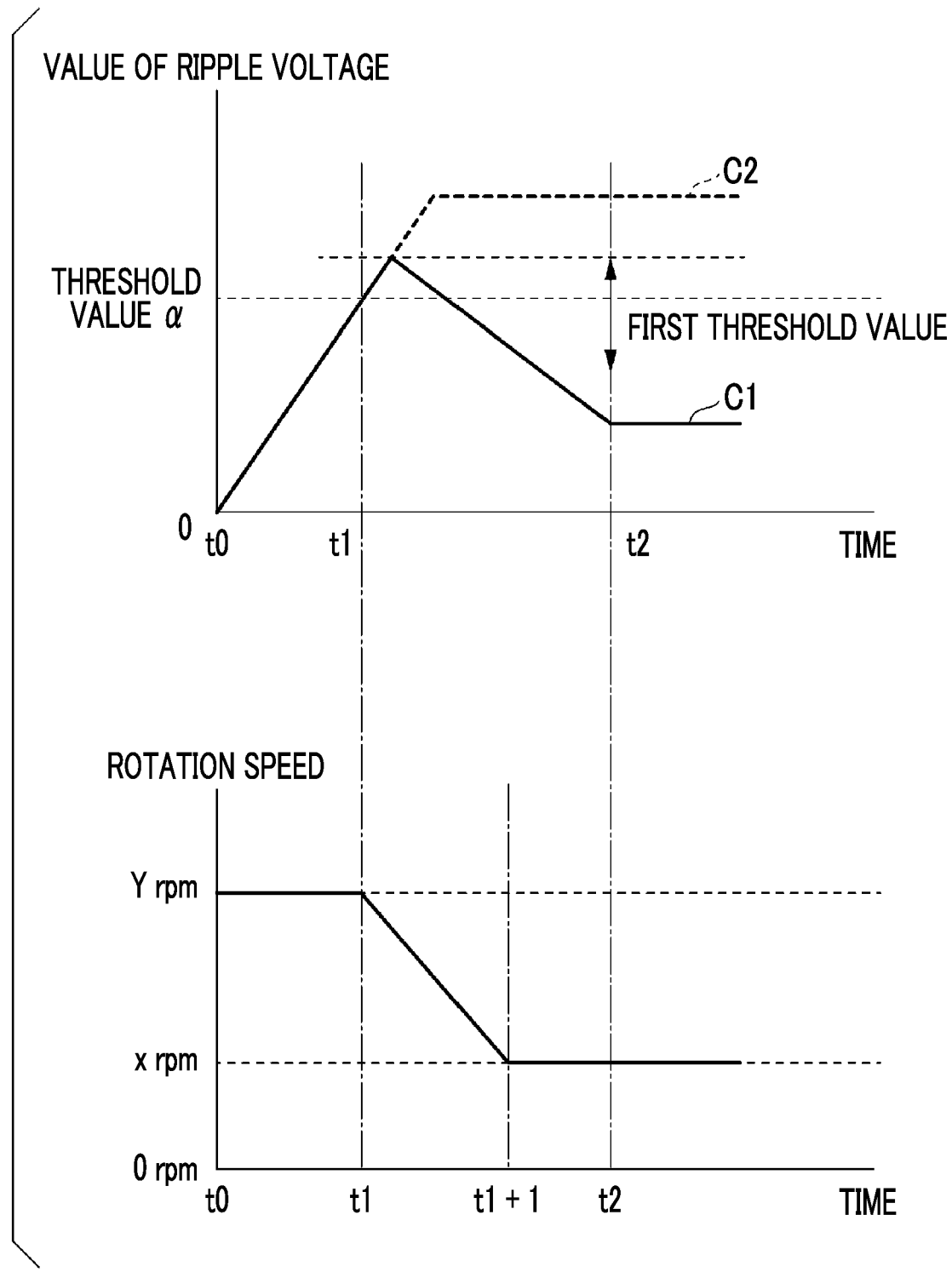
FIG. 3 is a second diagram illustrating the cause determination process in the embodiment.

FIG. 2 is a first diagram illustrating a cause determination process in the embodiment.

The vertical axis in the upper figure of FIG. 2 shows the value W of the ripple voltage detected by the detection unit 101, and the horizontal axis shows the time. The vertical axis in the lower figure of FIG. 2 shows the rotation speed of the motor 9, and the horizontal axis shows the time. The same position on the horizontal axes in the upper figure of FIG. 2 and the lower figure of FIG. 2 indicates the same time. These things are the same in FIG. 3.

With reference to the upper figure of FIG. 2, the value W of the ripple voltage at time t0 is 0. With reference to the lower figure of FIG. 2, the rotation speed of the motor 9 at time t0 is Y (rpm). Y (rpm) is a required rotation speed determined by the ECU of the vehicle based on the set temperature of the heating and cooling set by the user.

At time t1, the value W of the ripple voltage becomes equal to or higher than the threshold value α. The determination unit 102 instructs the control unit 103 to start the cause determination process, based on the fact that the value W becomes equal to or higher than the threshold value α. Then, the control unit 103 indicates the rotation speed 0 (zero) to the inverter 7. As shown in the graph C1 of the upper figure of FIG. 2, when the source of the ripple voltage is the electric compressor 20, the value W of the ripple voltage becomes small at time t1+1 after the motor 9 is stopped. On the other hand, when the source of the ripple voltage is the vehicle equipment 40, regardless of the operating state of the motor 9, as shown in the graph C2 in the upper figure of FIG. 2, the value W of the ripple voltage even after the motor 9 is stopped remains above, for example, the threshold value α.

The cause determination unit 104, for example, determines whether the cause of the abnormal ripple voltage is the electric compressor 20 or the vehicle equipment 40, based on the value W of the ripple voltage detected at time t2 when a predetermined time has elapsed since the control unit 103 stops the motor 9.

For example, if a degree of decrease of the value W before and after reducing the rotation speed of the motor 9 is equal to or higher than a predetermined first threshold value, the cause determination unit 104 determines that the cause of the abnormal ripple voltage is the electric compressor 20, and if not, the cause determination unit 104 determines that the cause of the abnormal ripple voltage is the vehicle equipment 40. Alternatively, if the value W after reducing the rotation speed of the motor 9 is equal to or higher than a predetermined second threshold value (for example, the threshold value α), the cause determination unit 104 may determine that the cause of the abnormal ripple voltage is the vehicle equipment 40, and if not, the cause determination unit 104 may determine that the cause is the electric compressor 20.

The control unit 103 may reduce the rotation speed of the motor 9 instead of stopping the motor 9. FIG. 3 is a second diagram illustrating the cause determination process in the embodiment.

As in the case of FIG. 2, the value W of the ripple voltage at time t0 is 0, and the rotation speed of the motor 9 is Y (rpm). The value W of the ripple voltage at time t1 exceeds the threshold value α. The determination unit 102 determines to start the cause determination process at time t1, based on the fact that the value W becomes equal to or higher than the threshold value α. The control unit 103 sets X (rpm), which is a value smaller than Y, as the target rotation speed, and indicates the rotation speed X to the inverter 7. When instruction of the rotation speed X at time t1 is given, the rotation speed of the motor 9 gradually decreases, and decreases to X (rpm) at time t1−1. When the source of the ripple voltage is the electric compressor 20, as shown in the graph C1, the value W of the ripple voltage becomes smaller as the rotation speed of the motor 9 decreases. On the other hand, when the source of the ripple voltage is the vehicle equipment 40, as shown in the graph C2, for example, the value W of the ripple voltage remains above the threshold value α regardless of the decrease in the rotation speed of the motor 9.

The cause determination unit 104 determines whether the cause of the abnormal ripple voltage is the electric compressor 20 or the vehicle equipment 40, based on, for example, the value W of the ripple voltage detected at time t2 when a predetermined time has elapsed since the rotation speed of the motor 9 becomes a predetermined rotation speed X (rpm).

For example, if a degree of decrease of the value W before and after reducing the rotation speed of the motor 9 is equal to or higher than a predetermined first threshold value, the cause determination unit 104 determines that the cause of the abnormal ripple voltage is the electric compressor 20, and if not, the cause determination unit 104 determines that the cause is the vehicle equipment 40. Alternatively, if the value W of the ripple voltage after reducing the rotation speed of the motor 9 is equal to or higher than a predetermined second threshold value (for example, the threshold value α), the cause determination unit 104 may determine that the cause of the abnormal ripple voltage is the vehicle equipment 40, and if not, the cause determination unit 104 may determine that the cause is the electric compressor 20.

In the cause determination process, by reducing the rotation speed of the motor 9 to the target rotation speed X without stopping the motor 9, the air conditioning can be continued even if it is weak.

The values of the first threshold value and the second threshold value may be different depending on whether the motor 9 is stopped or the rotation speed of the motor 9 is reduced.

Next, the flow of the cause determination process of the ripple voltage abnormality of the present embodiment will be described.

Figure 4:
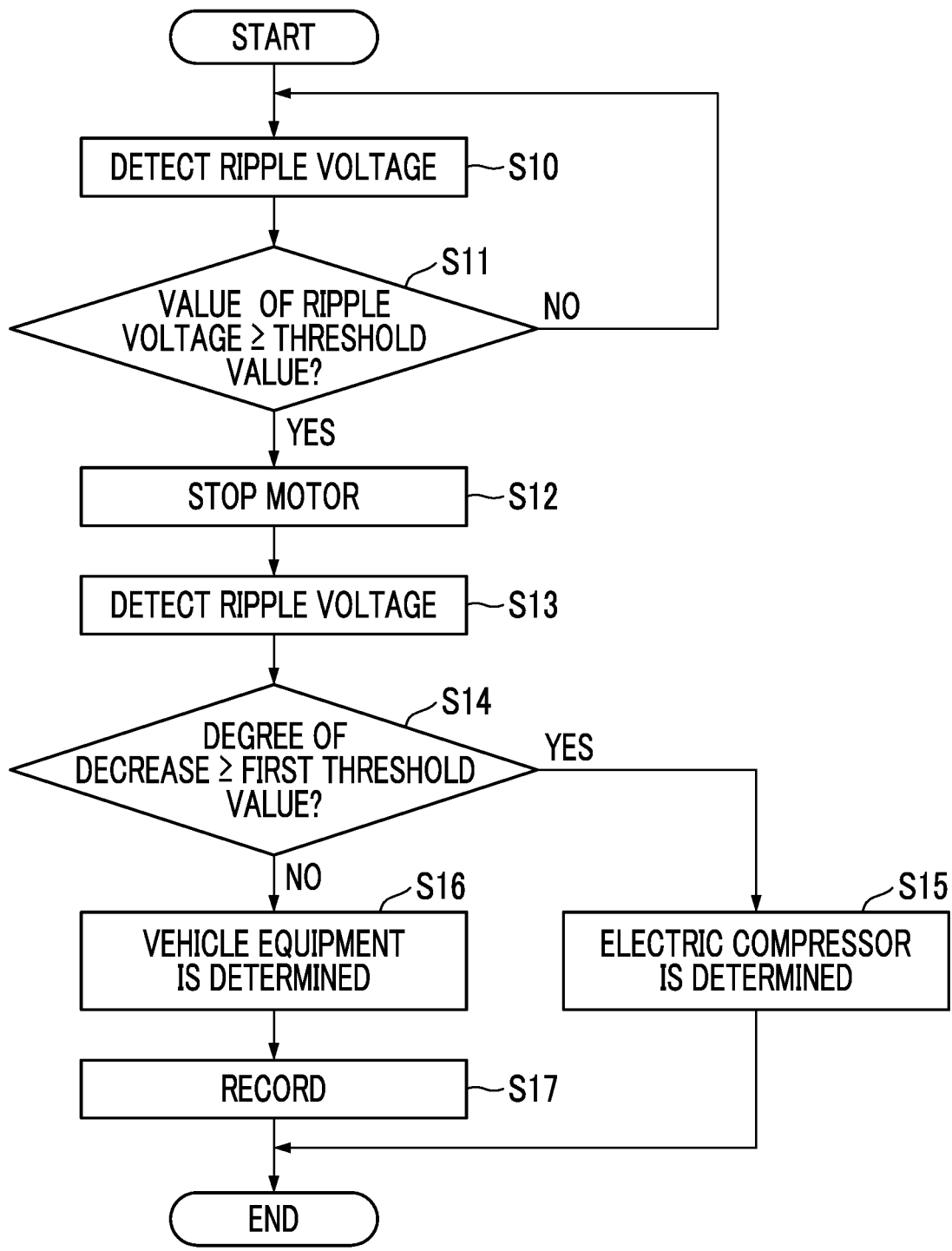
FIG. 4 is a first flowchart showing an example of the cause determination process in the embodiment.

FIG. 4 is a first flowchart showing an example of the cause determination process in the embodiment.

In the electric compressor 20, the motor 9 is driven at a required rotation speed Y according to the air conditioning load of the vehicle air conditioner 30.

First, the detection unit 101 detects the ripple voltage (step S10). The detection unit 101 detects the value W of the ripple voltage from the voltage value measured by the voltmeter 11 at a predetermined time. The detection unit 101 outputs the value W to the determination unit 102. The determination unit 102 determines whether or not the value W is equal to or higher than a threshold value α (step S11). When the value W is less than the threshold value α (step S11; No), the process from step S10 is repeated.

When the value W is equal to or higher than the threshold value α (step S11; Yes), the determination unit 102 instructs the control unit 103 to start the cause determination process. The determination unit 102 outputs the value W when the value W is equal to or higher than the threshold value α, to the cause determination unit 104. The control unit 103 stops the motor 9 (step S12). The control unit 103 may reduce the rotation speed of the motor 9 to the target rotation speed X.

Next, when a predetermined time elapses after the motor 9 is stopped or the rotation speed is reduced, the detection unit 101 detects the ripple voltage (step S13). The detection unit 101 outputs the value W of the ripple voltage to the cause determination unit 104. The cause determination unit 104 calculates the degree of decrease in the value W before and after the rotation speed control of the motor 9. For example, the cause determination unit 104 calculates the difference in the value W before and after the rotation speed control of the motor 9, and uses the difference as the degree of decrease. Alternatively, the cause determination unit 104 calculates what percentage of the value W before controlling the rotation speed of the motor 9 corresponds to the calculated difference, and sets this value as the degree of decrease. The cause determination unit 104 compares the calculated degree of decrease with the first threshold value (step S14).

When the degree of decrease is equal to or higher than the first threshold value (step S14; Yes), the cause determination unit 104 determines that the cause of the abnormal ripple voltage is the electric compressor 20 (step S15).

When the degree of decrease is less than the first threshold value (step S14; No), the cause determination unit 104 determines that the cause of the abnormal ripple voltage is the vehicle equipment 40 (step S16). When the cause is the vehicle equipment 40, the recording unit 105 records in the storage device 13 that the abnormality in the ripple voltage caused by the vehicle equipment 40 is detected (step S17). For example, the recording unit 105 records the time (time t2) when the cause determination unit 104 determines that the cause of the ripple voltage abnormality is the vehicle equipment 40 in association with the detection of the abnormality. The detection unit 101 repeatedly detects the ripple voltage even after time t2, and each detection time, the cause determination unit 104 calculates the degree of decrease based on the difference between the value W of the ripple voltage before the control of the rotation speed of the motor 9 and the latest value W of the ripple voltage detected by the detection unit 101. Then, for example, the recording unit 105 continues to record in the storage device 13 that the abnormality in the ripple voltage caused by the vehicle equipment 40 is detected until the calculated degree of decrease becomes equal to or higher than a first threshold value, together with the detection time of the ripple voltage.

The control unit 103 continues to maintain the operating state of the motor 9 which has been stopped or of which the rotation speed has been reduced in step S12.

According to the present embodiment, when there are a plurality of sources of ripple voltage and an abnormality in the ripple voltage that can cause resonance is detected, the source of the ripple voltage can be determined. Therefore, it is possible to deal with the abnormality in the ripple voltage according to the source. For example, when the equipment to be controlled (electric compressor 20) is the source, resonance can be avoided by stopping the operation of the equipment. For example, when the source is an external equipment (vehicle equipment 40) that is not subject to control, a log indicating the occurrence of an abnormality can be recorded in the storage device 13. Thus, the manufacturer of the electric compressor 20 can urge the manufacturer of the vehicle equipment 40 to reduce the generation of an abnormal ripple voltage by providing the log recorded in the storage device 13 to the manufacturer of the vehicle equipment 40.

In the flowchart of FIG. 4, an example of determining the source of the ripple voltage by comparing the degree of decrease of the value W of the ripple voltage with the first threshold value has been described, but the source may be determined based on the value W after reducing the rotation speed of the motor 9. In the flowchart of FIG. 4, after the abnormality in the ripple voltage is detected, the motor 9 is stopped or maintained at a reduced rotation speed, but when safety can be confirmed, the rotation speed of the motor 9 may return to the required rotation speed Y. Next, a case where these processes are performed will be described with reference to FIG. 5. The process similar to that of FIG. 4 will be briefly described.

Figure 5:
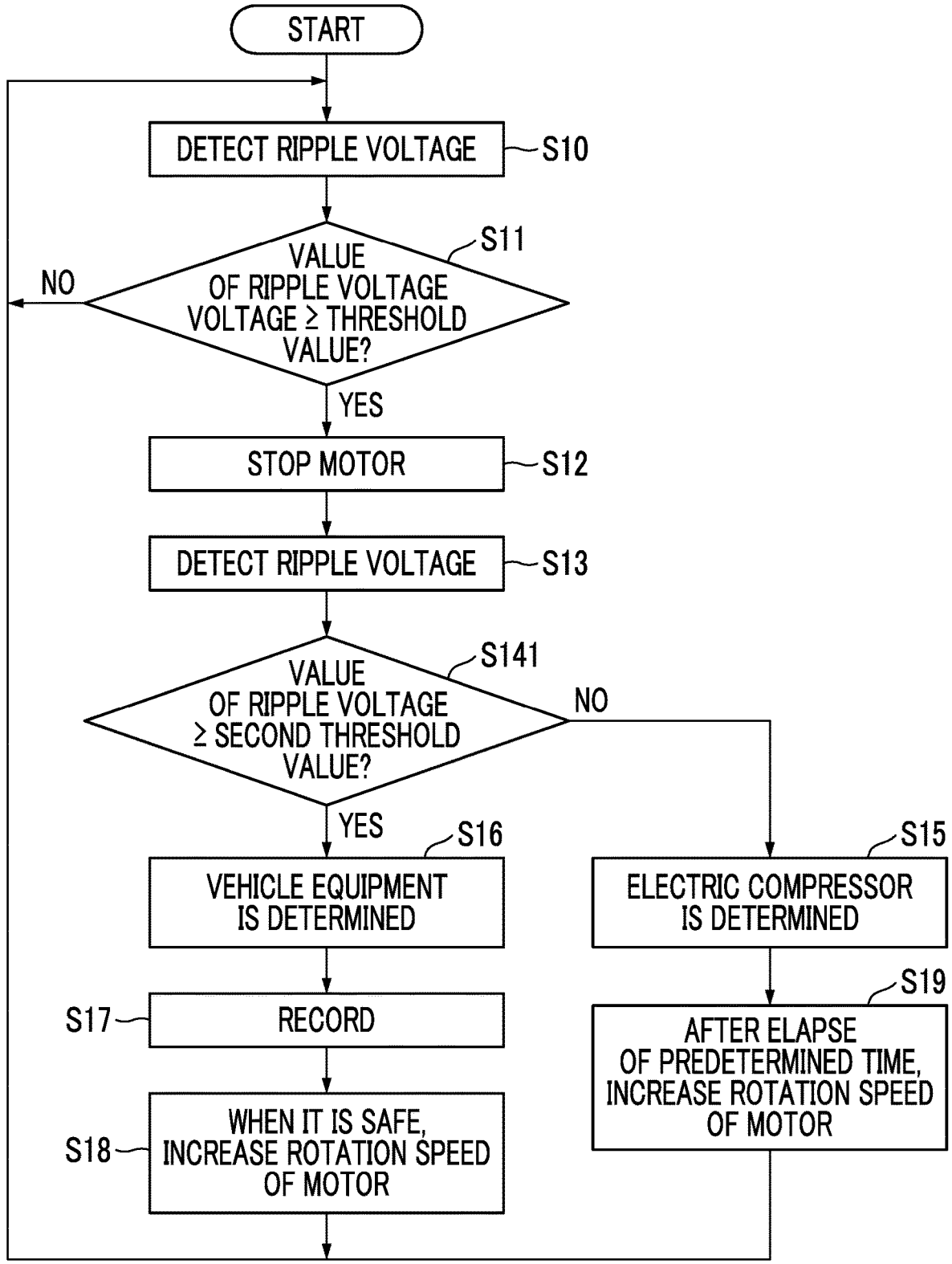
FIG. 5 is a second flowchart showing an example of the cause determination process in the embodiment.

FIG. 5 is a second flowchart showing an example of the cause determination process in the embodiment.

First, the detection unit 101 detects the ripple voltage (step S10). Next, the determination unit 102 determines whether or not the value W of the ripple voltage is equal to or higher than the threshold value α (step S11). When the value W is less than the threshold value α (step S11; No), the process from step S10 is repeated. When the value W is equal to or higher than the threshold value α (step S11; Yes), the determination unit 102 instructs the control unit 103 to start the cause determination process. The control unit 103 stops the motor 9 (step S12). Next, when a predetermined time elapses after the motor 9 is stopped, the detection unit 101 detects the ripple voltage (step S13). The cause determination unit 104 compares the value W of the ripple voltage after the motor 9 is stopped, detected by the detection unit 101, with the second threshold value (step S141).

When the value W of the ripple voltage is less than the second threshold value (step S141; No), the cause determination unit 104 determines that the cause of the abnormal ripple voltage is the electric compressor 20 (step S15). The cause determination unit 104 outputs the determination result to the control unit 103. The abnormality in the ripple voltage may have been caused by a transient phenomenon. In this case, if the transient phenomenon is settled, the abnormality does not occur in the ripple voltage. Therefore, the control unit 103 increases the rotation speed of the motor 9 to the required rotation speed Y after the elapse of the predetermined time T1 (step S19). When the abnormality does not occur in the ripple voltage even if the rotation speed of the motor 9 is increased, the control unit 103 maintains the rotation speed of the motor 9. In a case where an abnormality occurs in the ripple voltage, when the motor 9 is stopped again and time T1 elapses, the control unit 103 repeats the control to increase the rotation speed of the motor 9 to the required rotation speed Y, until an abnormality does not occur in the ripple voltage or the number of motor restarts reaches a predetermined upper limit. When an abnormality occurs in the ripple voltage no matter how many times the motor is restarted, the control unit 103 maintains the motor 9 stopped. Thus, it is possible to perform air conditioning by the vehicle air conditioner 30 while preventing resonance due to the ripple voltage, and to reduce a decrease in user comfort. In step S12, similar control can be performed even when the rotation speed of the motor 9 is reduced to X (rpm). The control unit 103 may not increase the rotation speed of the motor 9 to Y (rpm) at a time, but may increase the rotation speed stepwise toward the required rotation speed Y. In this case, even if the rotation speed of the motor 9 cannot be increased to Y, the control unit 103 may increase the rotation speed to the maximum rotation speed at which the abnormality does not occur in the ripple voltage and cause the motor continue to operate as it is.

On the other hand, when the value W of the ripple voltage is equal to or higher than the second threshold value (step S141; Yes), the cause determination unit 104 determines that the cause of the abnormal ripple voltage is the vehicle equipment 40 (step S16). The recording unit 105 records in the storage device 13 that an abnormality in the ripple voltage caused by the vehicle equipment 40 is detected (step S17). Generally, the frequency f1 of the ripple voltage originating from the vehicle equipment 40 is different from the frequency f0 of the ripple voltage originating from the electric compressor 20, and the threshold values for determining the occurrence of resonance are often different. For example, in a case where f1 and f0 are different, or in a case where the threshold value for determining the occurrence of resonance of the vehicle equipment 40 is larger than the threshold value α, even if a ripple voltage is generated in which the value W caused by the electric compressor 20, when the electric compressor 20 is started, is less than the threshold value α, resonance caused by this does not occur in the electric circuit. Therefore, for example, when information on the nature of the ripple voltage is obtained in advance from the manufacturer of the vehicle equipment 40 and it is certain that it is safe to restart the electric compressor 20 (f0 and f1 are different, or the threshold value for f1 is sufficiently larger than the threshold value α), the control unit 103 increases the rotation speed of the motor 9 to the required rotation speed Y (step S18). Thus, the air conditioning capacity of the vehicle air conditioner 30 can be quickly restored, and a decrease in user comfort can be reduced. Even after increasing the rotation speed of the motor 9, the control device 10 performs the process from step S10.

According to the present embodiment, when the value W of the ripple voltage becomes equal to or higher than the threshold value, it is determined that resonance may occur in the electric circuit, and the rotation speed of the motor 9 of the electric compressor 20 is reduced. Then, the cause of the abnormality in the ripple voltage is determined based on the change of the ripple voltage due to the decrease in the rotation speed. When the cause of the abnormality in the ripple voltage is the electric compressor 20, the resonance occurring in the circuit can be prevented by appropriately controlling the motor 9, and damage to the electric compressor 20 and the like can be prevented.

When the cause of the abnormality in the ripple voltage is the vehicle equipment 40, evidence of the occurrence of the abnormal ripple voltage caused by the vehicle equipment 40 can be left by recording the log describing the occurrence of the abnormality. By providing the recorded log to the manufacturer of the vehicle equipment 40, it can be requested to reduce the generation of an abnormal ripple voltage.

After determining the source of the abnormal ripple voltage, the vehicle air conditioner 30 can perform air conditioning by driving the motor 9 to the extent that safety can be guaranteed, and a decrease in user comfort can be improved.

Figure 6:
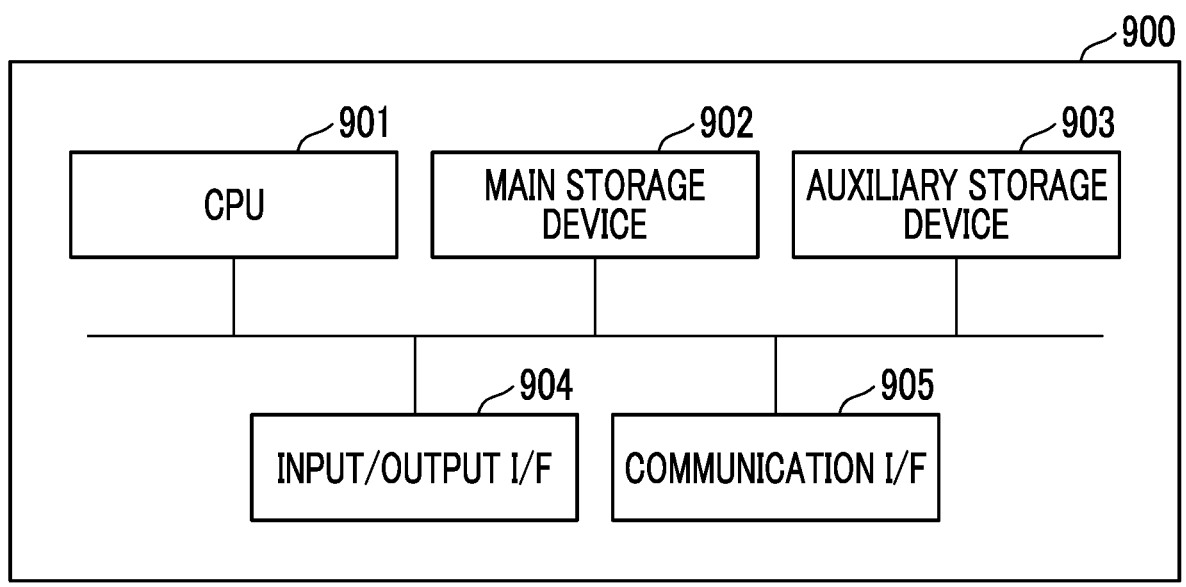
FIG. 6 is a diagram showing an example of a hardware configuration of the control device or the like in the embodiment.

FIG. 6 is a diagram showing an example of a hardware configuration of the control device or the like in the embodiment.

A computer 900 includes a CPU 901, a main storage device 902, an auxiliary storage device 903, an input/output interface 904, and a communication interface 905.

The control device 10 and the storage device 13 described above are mounted on the computer 900. Each of the above-described functions is stored in the auxiliary storage device 903 in the form of a program. The CPU 901 reads the program from the auxiliary storage device 903, extracts the program into the main storage device 902, and executes the above process according to the program. The CPU 901 secures a storage area in the main storage device 902 according to the program. The CPU 901 secures a storage area for storing the data being processed in the auxiliary storage device 903 according to the program.

A program for achieving all or a part of the functions of the control device 10 and the storage device 13 is recorded on a computer-readable recording medium, and the process by each functional unit may be performed by a computer system reading and executing the program recorded on the recording medium. The term "computer system" as used herein includes an OS and hardware such as peripheral devices. The "computer system" includes a homepage providing environment (or a display environment) when a WWW system is used. The "computer-readable recording medium" refers to a portable medium such as a CD, DVD, or USB, or a storage device such as a hard disk built in a computer system. When this program is delivered to the computer 900 through a communication line, the computer 900 receiving the delivered program may extract the program in the main storage device 902 and execute the above process. The above-described program may achieve a part of the above-described functions, or may further achieve the above-described functions in combination with the program already recorded in the computer system.

As described above, some embodiments according to the present disclosure have been described, but all of these embodiments are presented as examples and are not intended to limit the scope of invention. These embodiments can be implemented in various other embodiments, and various omissions, replacements, and changes can be made without departing from the gist of the invention. These embodiments and variations thereof are included in the scope of the invention described in the claims as well as in the equivalent scope and abstract of the invention.

For example, the detection unit 101, the determination unit 102, the cause determination unit 104, and the recording unit 105 of the present embodiment may be mounted on a computer different from the control device 10 of the electric compressor 20.

<Additional Notes>

The control device 10, the electric compressor 20, the ripple voltage abnormality cause determination method, and the program described in each embodiment are grasped as follows, for example.

(1) The control device 10 according to a first aspect is the control device 10 for an electric compressor 20, including a detection unit 101 that detects ripple voltage; a determination unit 102 that determines whether the ripple voltage is abnormal based on a value W of the ripple voltage; and a cause determination unit 104 that determines whether a cause of the abnormality is the electric compressor or some other external equipment, based on a control result of the electric compressor.

According to the control device 10, when an abnormality in the ripple voltage is detected, the source of the ripple voltage can be determined. Thereby, for example, it is possible to perform control according to the source, and avoid the occurrence of resonance due to the abnormality in the ripple voltage.

(2) The control device 10 according to a second aspect is the control device 10 in (1), further including a control unit 103 that controls a rotation speed of a motor 9 included in the electric compressor 20, in which when the determination unit 102 determines that the ripple voltage is abnormal, the control unit 103 reduces the rotation speed of the motor 9, and the cause determination unit 104 determines that the cause is the electric compressor 20 when a degree of decrease of the value W of the ripple voltage before and after reducing the rotation speed is equal to or higher than a predetermined first threshold value, and determines that the cause is the external equipment (vehicle equipment 40) when the degree of decrease is less than the first threshold value.

By monitoring the degree of decrease in the value W of the ripple voltage caused by reducing (including stopping) the rotation speed of the motor 9 of the electric compressor 20, if the degree of decrease is large (when the decrease in the rotation speed of the motor 9 greatly affects the ripple voltage), it can be determined that the cause of the abnormal ripple voltage is the electric compressor 20, and if not, it is the vehicle equipment 40.

(3) The control device 10 according to a third aspect is the control device 10 in (1), further including a control unit 103 that controls a rotation speed of a motor 9 included in the electric compressor 20, in which when the determination unit 102 determines that the ripple voltage is abnormal, the control unit 103 reduces the rotation speed of the motor 9, and the cause determination unit 104 determines that the cause is the external equipment (vehicle equipment 40) when the value W of the ripple voltage after reducing the rotation speed is equal to or higher than a predetermined second threshold value, and determines that the cause is the electric compressor 20 when the value W of the ripple voltage is less than the second threshold value.

By monitoring the value W of the ripple voltage after reducing (including stopping) the rotation speed of the motor 9 of the electric compressor 20, if the value W becomes equal to or less than the second threshold value (when the decrease in the rotation speed of the motor 9 greatly affects the decrease in the value W of the ripple voltage), it can be determined that the cause of the abnormal ripple voltage is the electric compressor 20, and if not, it is the vehicle equipment 40.

(4) The control device 10 according to a fourth aspect is the control device 10 in (2) and (3), in which when the cause determination unit 104 determines that the cause is the external equipment (the vehicle equipment 40), the control unit 103 restores the rotation speed of the motor 9 to the rotation speed Y before reducing the rotation speed.

When the cause of the abnormal ripple voltage is determined to be the vehicle equipment 40 and has nothing to do with the operation of the electric compressor 20, the rotation speed of the motor 9 can be increased to the original required rotation speed Y.

(5) The control device 10 according to a fifth aspect is the control device 10 in (2) to (4), in which when the cause determination unit 104 determines that the cause is the electric compressor 20, the control unit 103 maintains the rotation speed of the motor 9 at the rotation speed after reducing the rotation speed.

When the cause of the abnormal ripple voltage is the electric compressor 20, the occurrence of resonance can be avoided by maintaining the rotation speed of the motor 9 reduced (including stopping).

(6) The control device 10 according to a sixth aspect is the control device 10 in (2) to (4), in which when the cause determination unit 104 determines that the cause is the electric compressor 20, the control unit 103 increases the rotation speed of the motor 9 toward the rotation speed Y before reducing the rotation speed, while controlling the value W of the ripple voltage to be equal to or less than a predetermined threshold value α.

When the cause of the abnormal ripple voltage is the electric compressor 20, the capacity of the electric compressor 20 can be restored by increasing the rotation speed of the motor 9 while controlling the value W of the ripple voltage to be equal to or less than the threshold value α.

(7) The control device 10 according to a seventh aspect is the control device 10 in (1) to (6), further including a recording unit 105 that records the cause in a storage device, in which when the cause determination unit 104 determines that the cause is the external equipment (vehicle equipment 40), the recording unit 105 records that the abnormality in the ripple voltage caused by the external equipment (vehicle equipment 40) is detected.

When the cause of the abnormal ripple voltage is the vehicle equipment 40, the control device 10 cannot control the vehicle equipment 40, so that the abnormal ripple voltage cannot be reduced, but by the recording unit 105 recording that the abnormal ripple voltage is detected, it is possible to leave evidence that the abnormal ripple voltage caused by the vehicle equipment 40 has occurred.

(8) The electric compressor 20 according to an eighth aspect includes the control device in (1) to (7).

(9) A ripple voltage abnormality cause determination method according to a ninth aspect includes by a control device 10, detecting a ripple voltage, determining whether or not the ripple voltage is abnormal, based on a value W of the ripple voltage, and determining whether a cause of the abnormality is equipment (the electric compressor 20) to be controlled or another equipment (vehicle equipment 40), based on a control result of the equipment (the electric compressor 20) to be controlled.

(10) A program according to a tenth aspect causes a computer to function as means for detecting a ripple voltage, means for determining whether or not the ripple voltage is abnormal, based on a value of the ripple voltage W, and means for determining, based on a control result of predetermined equipment, whether a cause of the abnormality is the equipment or another equipment.

INDUSTRIAL APPLICABILITY

According to the control device, the electric compressor, and the ripple voltage abnormality cause determination method, and the program described above, when the ripple voltage is abnormal, a source of a ripple voltage that causes abnormality can be determined.

REFERENCE SIGNS LIST

1 Battery
2 Capacitor
3 Inverter
4 Load
5a, 5b Inductor
6 Capacitor
7 Inverter
8 Power supply circuit
9 Motor
10 Control device
101 Detection unit
102 Determination unit
103 Control unit
104 Cause determination unit
105 Recording unit
11 Voltmeter
12 Compression unit
13 Storage device
20 Electric compressor
30 Vehicle air conditioner
40 Vehicle equipment
900 Computer
901 CPU
902 Main storage device
903 Auxiliary storage device
904 Input/output interface
905 Communication interface

The invention claimed is:
1. A control device for an electric compressor, the control device comprising:
a detection unit that detects a ripple voltage;

a determination unit that determines whether or not the ripple voltage is abnormal, based on a value of the ripple voltage;

a control unit that controls the electric compressor such that the ripple voltage is reduced when the ripple voltage is determined to be abnormal by the determination unit; and a cause determination unit that determines which one of the electric compressor and some other external equipment is causing the abnormality, based on a result of the control of the electric compressor performed by the control unit to reduce the ripple voltage.

2. The control device according to claim 1, wherein
when the determination unit determines that the ripple voltage is abnormal, the control unit reduces a rotation speed of a motor included in the electric compressor, and
the cause determination unit determines that the cause is the electric compressor when a degree of decrease of the value of the ripple voltage before and after reducing the rotation speed is equal to or higher than a predetermined first threshold value, and determines that the cause is the external equipment when the degree of decrease is less than the first threshold value.

3. The control device according to claim 1, wherein
when the determination unit determines that the ripple voltage is abnormal, the control unit reduces a rotation speed of a motor included in the electric compressor, and
the cause determination unit determines that the cause is the external equipment when the value of the ripple voltage after reducing the rotation speed is equal to or higher than a predetermined second threshold value, and determines that the cause is the electric compressor when the value of the ripple voltage is less than the second threshold value.

4. The control device according to claim 2, wherein
when the cause determination unit determines that the cause is the external equipment,
the control unit restores the rotation speed of the motor to the rotation speed before reducing the rotation speed.

5. The control device according to claim 2, wherein
when the cause determination unit determines that the cause is the electric compressor, the control unit maintains the rotation speed of the motor at the rotation speed after reducing the rotation speed.

6. The control device according to claim 2, wherein
when the cause determination unit determines that the cause is the electric compressor,
the control unit increases the rotation speed of the motor toward the rotation speed before reducing the rotation speed, while controlling the value of the ripple voltage to be equal to or less than a predetermined threshold value.

7. The control device according to claim 1, further comprising:
a recording unit that records the cause in a storage device, wherein
when the cause determination unit determines that the cause is the external equipment, the recording unit records that abnormality in the ripple voltage caused by the external equipment is detected.

8. An electric compressor comprising:
the control device according to claim 1.

9. A ripple voltage abnormality cause determination method comprising:
by a control device,
detecting a ripple voltage;
determining whether or not the ripple voltage is abnormal, based on a value of the ripple voltage;
controlling an equipment to be controlled such that the ripple voltage is reduced when the ripple voltage is determined to be abnormal in the step of determining whether or not the ripple voltage is abnormal; and
determining which one of the electric compressor and another equipment is causing the abnormality, based on a result of the control of the electric compressor performed by the control unit to reduce the ripple voltage.

10. A non-transitory computer-readable recording medium storing program causing a computer to function as:
means for detecting a ripple voltage;
means for determining whether or not the ripple voltage is abnormal, based on a value of the ripple voltage;
means for controlling an electric compressor such that the ripple voltage is reduced when the ripple voltage is determined to be abnormal by the means for determining whether or not the ripple voltage is abnormal; and
means for determining which one of the electric compressor and some other external equipment is causing abnormality, based on a result of the control of the electric compressor to reduce the ripple voltage.

11. The control device according to claim 3, wherein
when the cause determination unit determines that the cause is the external equipment,
the control unit restores the rotation speed of the motor to the rotation speed before reducing the rotation speed.

12. The control device according to claim 3, wherein
when the cause determination unit determines that the cause is the electric compressor,
the control unit maintains the rotation speed of the motor at the rotation speed after reducing the rotation speed.

13. The control device according to claim 3, wherein
when the cause determination unit determines that the cause is the electric compressor,
the control unit increases the rotation speed of the motor toward the rotation speed before reducing the rotation speed, while controlling the value of the ripple voltage to be equal to or less than a predetermined threshold value.

14. A control device for an electric compressor included in a vehicle air conditioner which is connected to a vehicle equipment via an electric circuit, the control device comprising:
a detection unit that detects a ripple voltage;
a determination unit that determines whether or not the ripple voltage is abnormal, based on a value of the ripple voltage; and
a cause determination unit that determines which one of the electric compressor and the vehicle equipment is causing the abnormality, based on a result of controlling the electric compressor to reduce the ripple voltage.

15. The control device according to claim 1, wherein the cause determination unit determines which one of the electric compressor and some other external equipment is causing the abnormality, based on a transition of the ripple voltage as a result of the control of the electric compressor performed by the control unit to reduce the ripple voltage.

16. The ripple voltage abnormality cause determination method according to claim 9, wherein
the determining step determines which one of the electric compressor and some other external equipment is causing the abnormality, based on a transition of the ripple voltage as a result of the controlling the electric compressor to reduce the ripple voltage.

17. The non-transitory computer-readable recording medium storing program according to claim 10, wherein which one of the electric compressor and some other external equipment is causing the abnormality is determined based on a transition of the ripple voltage as a result of the controlling the electric compressor to reduce the ripple voltage.

* * * * *